United States Patent [19]

Jones et al.

[11] 4,172,545
[45] Oct. 30, 1979

[54] PLANETARY WIRE FEEDER

[76] Inventors: Wendell M. Jones, 811 Fairhills Dr., Chattanooga, Tenn. 37405; James L. Sattler, Rte. 5, Larry Dr., Ringgold, Ga. 30736

[21] Appl. No.: 966,399

[22] Filed: Dec. 4, 1978

[51] Int. Cl.² ............................................. B65H 17/22
[52] U.S. Cl. ................................ 226/168; 226/181; 226/90
[58] Field of Search .................. 226/90, 91, 111, 168, 226/176, 177, 181, 187, 195; 74/25; 214/338, 339; 219/130

[56] References Cited

U.S. PATENT DOCUMENTS

| 1,355,616 | 10/1920 | Mohn | 214/339 |
|---|---|---|---|
| 2,152,518 | 3/1939 | Wolff | 74/25 |
| 3,424,012 | 1/1969 | Hirmann | 74/25 |
| 3,517,844 | 6/1970 | Wloszek | 214/338 |
| 3,738,555 | 6/1973 | Karnes et al. | 226/168 |
| 3,744,694 | 7/1973 | Karnes et al. | 226/168 |
| 3,990,622 | 11/1976 | Schurman, Jr. et al. | 228/53 |
| 4,049,172 | 9/1977 | Samokovliski et al. | 226/90 |
| 4,085,880 | 4/1978 | Samokovliski et al. | 226/90 |

Primary Examiner—Leonard D. Christian
Attorney, Agent, or Firm—John E. McGarry

[57] ABSTRACT

A planetary wire feeder for feeding wire workpieces such as welding wire for a MIG or TIG welding operation comprises two sets of rollers connected to rotate in unison about the axis of the wire and radially spaced from each other in a housing. Roller holders have an axially tapered outer surface and are axially movable within the housing. Stationary gibs mounted within the housing with complementary tapered surfaces adjust the spacing between the roller holders at different axial positions of the roller holders within the housing. A nipple is provided on one roller holder tapered outer surface to equalize the pressure of each set of rollers on the wire.

9 Claims, 2 Drawing Figures

PLANETARY WIRE FEEDER

BACKGROUND OF THE INVENTION

1. Field of the Invention

This invention relates to wire feeders of a planetary type. In one of its aspects, the invention relates to a planetary wire feeder with a plurality of sets of driven rollers and means to adjust the spacing between the rollers and the pressure applied by the rollers.

2. State of the Prior Art

Planetary wire feeders are well known and are used advantageously for feeding wire such as welding wire in a welding operation. It is necessary in such operations to feed the wire consistently and at a predetermined rate so that the welder can concentrate on the quality of weld and need not worry about the sufficiency of the wire at the weld. If the rate of wire feed is too small, the weld bead is too small and the weld consequently may not be strong enough. If the wire feeding is too fast, then the weld bead is too large and excess welding wire is used. If the feeding is erratic, the weld may have weak portions.

Examples of planetary wire feeders are disclosed in the Karnes et al U.S. Pat. Nos. 3,738,555 (issued June 12, 1973) and 3,744,694 (issued July 10, 1973) and in Samokovliski et al U.S. Pat. Nos. 4,049,172 (issued Sept. 20, 1977) and 4,085,880 (issued Apr. 25, 1978). In the Karnes et al U.S. Pat. No. 3,744,694 a wire feeding chuck having two sets of tandem drive rollers is disclosed.

These wire feeding chucks are relatively complex in construction and the commercial embodiments are not completely satisfactory in consistently feeding welding wire in a welding operation. Further, the structures do not readily allow for adaptability to feeding radically different size wires.

SUMMARY OF THE INVENTION

According to the invention there is provided a planetary actuator for feeding a wire workpiece, for example welding wire, wherein two sets of rollers are positioned in a housing at an angle to an axis thereof and the rollers are rotatable about the axis to drive the wire workpiece along the axis. A plurality of holders, each of which mounts two rollers, one from each set of the rollers, is mounted for limited axial movement within the housing. Means bias the holder to one end of the housing and means are provided for selectively moving the holders toward another end of the housing. Means vary the spacing between the holders and between the opposing rollers in each set of rollers at different axial positions of the holders within the housing.

Means are provided to equalize the pressure on each set of the rollers in the wire workpiece. Preferably, the spacing varying means includes an axially tapering surface on the holder and a stationary member having a complementary tapering surface in contact with the holder axially tapering surface. The pressure adjustment means is provided by a nipple on either the axially tapering stationary member surface or the axially tapering holder surface.

According to a specific embodiment of the invention, the housing comprises a hollow casing having an open end and a cap covers the open end and forms the one end of the housing against which the holders are biased. The cap is threaded onto the housing so that adjustment of the cap with respect to the casing results in axial adjustment of the holders.

Each set of rollers can comprise two or more rollers. It has been found, however, that two rollers in each set adequately drive the wire.

BRIEF DESCRIPTION OF THE DRAWINGS

The invention will now be described with reference to the accompanying drawings in which.

DESCRIPTION OF THE PREFERRED EMBODIMENT

Figure 1:
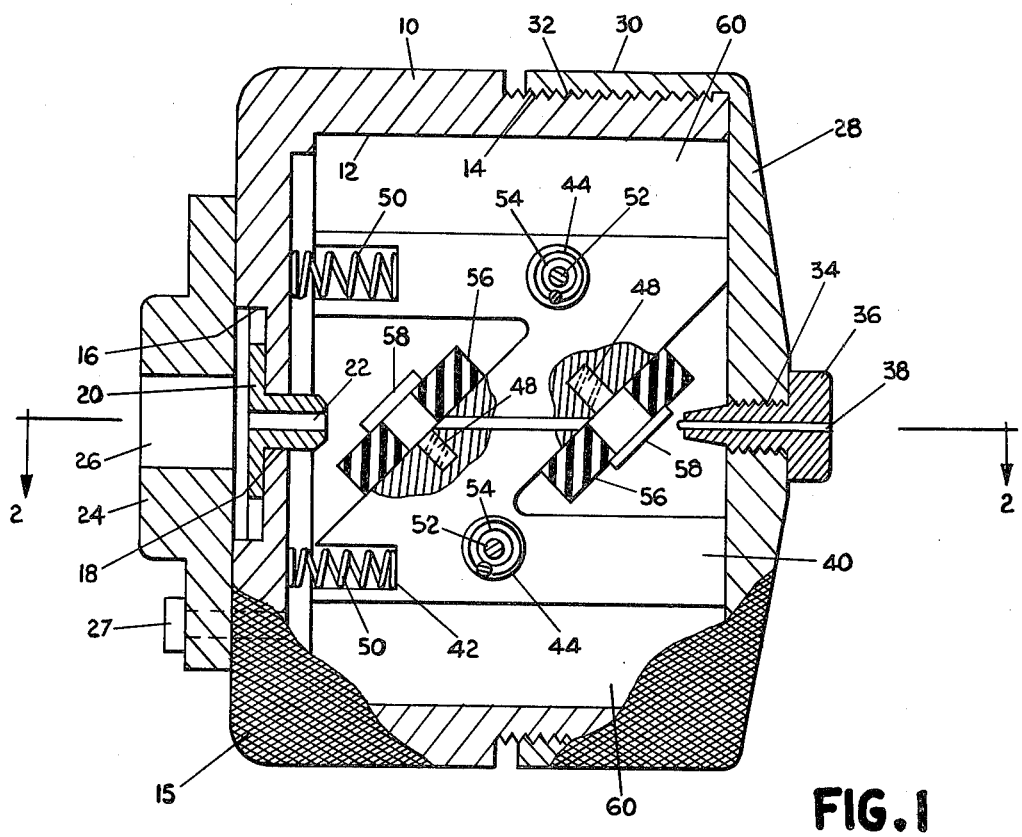
FIG. 1 is a side elevational view in section of a wire-feeding chuck according to the invention.

Referring now to the drawings, there is shown a wire-feeding chuck comprising a casing 10 having a hollow inner surface 12 and a threaded outer surface 14 at one end thereof. A knurled outer surface 15 is provided adjacent to the threaded outer surface 14. A casing has a recessed end 16 with an opening 18 therethrough. A wire guide 20 is snugly positioned in the recessed end 16 in opening 18. The wire guide 20 has an opening 22 sized to fit the particular wire which is being fed by the chuck. An adaptor plate 24 is mounted to the end of casing 10 through bolt 27 to retain the wire guide 20 in position. A threaded opening 26 is provided through the adaptor plate 24. A motor shaft (not shown) having a threaded outer surface is threaded into the threaded opening 26 to secure the chuck to a motor drive.

An adjusting cap 28 has a depending sleeve 30 with a threaded inner surface 32 for threading the cap 28 onto the threaded surface 14 of casing 10. A tapped opening 34 is provided centrally in the cap 28 and a guide member 36 having a bore 38 is threadably secured into the tapped opening 34. The housing for the chuck is thus formed by a combination of the casing 10 and the adjusting cap 28.

A pair of roller holders 40 are mounted within the casing 10 and abut the inner axial end of the cap 28. Axial bores 42 are provided at the back end of the roller holders 40 and lateral bores 44 are provided at central portions thereof. The roller holders 40 have axially tapered outer surfaces 46. As illustrated in FIG. 1, the roller holders 40 are formed in a "Z" shape. At the inner part of the Z, tapped holes 48 are provided at a 45° angle to the axis of the chuck. Springs 50 are mounted in the axial bores 42 and abut the inner end of the casing 10 to bias the roller holders forwardly against the inner axial end of the cap 28. Springs 54 with guide pins 52 centrally mounted therein are positioned in the lateral bores 44 to bias the roller holders 40 away from each other and outwardly.

Four identically sized rollers 56 are rotatably mounted to the roller holders 40 through roller mounting studs 58 which threadably engage the tapped holes 48. As illustrated in the drawings, the rollers are positioned at a 45° angle to the axis of a wire 74 which is fed through the chuck. Further, each roller in a pair of rollers is positioned at 90° with respect to the opposing roller in the pair.

Stationary gib members 60 and 62 are mounted between the inner surface 12 of casing 10 and the roller holders 40. Each of the gibs has a curved outer surface 64 and a tapered inner surface 66. Curved outer surface 64 conforms with the inner surface 12 of casing 10. The tapered inner surface of the stationary gib members 60 and 62 is complementary to the beveled surfaces 46 of the roller holders 40. One of the roller holders 40 has a centrally located nipple 68 on the tapered outer surface 46, which nipple abuts the tapered surface 66 of the adjacent gib member 60. The function of the nipple 68 is to permit a slight oscillation of the roller holder 40 to balance the pressure applied by the two sets of rollers 56 on the wire 74. Alternatively the nipple could be provided on the tapered surface 66 of the gib member 60.

The stationary gib members 60 and 62 each have a lateral tapped hole 70 through which the stationary members are firmly secured to the casing 10 through machine screws 72.

In operation, the wire is fed through the opening 22 and bore 48. The chuck is rotated by a drive motor (not shown) attached to adapter plate 24 so that each of the wheels 56 rotates about the wire 72, thereby imparting an axial force to the wire in a direction to the right illustrated in the drawings. The two sets of rollers firmly grip the wire with even pressure and drive the wire at an even rate without marking the wire in any manner.

Figure 2:
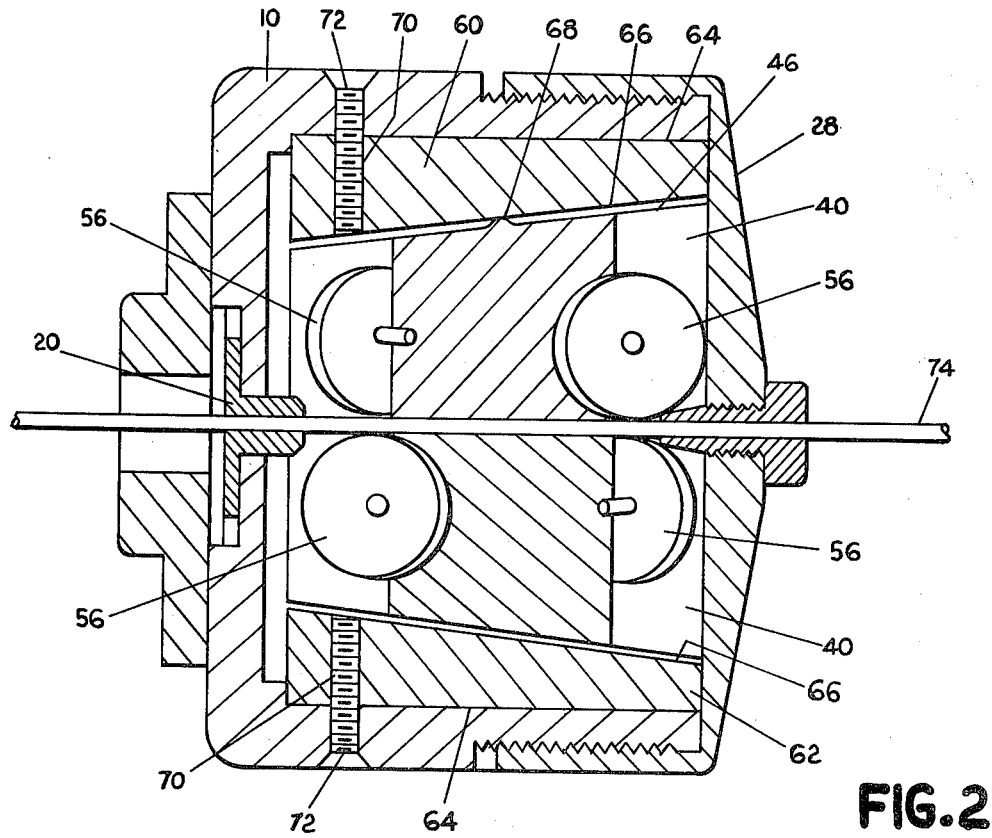
FIG. 2 is a view taken along lines 2—2 of FIG. 1.

The pressure on the wire is adjusted by rotating the cap 28 with respect to the casing 10. As the cap is tightened, for example, onto the casing 10, the roller holders 40 are forced to the left. As shown in FIG. 2, the tapered surfaces 66 of the gibs 60 and 62 force the roller holders 40 closer together. Alleviating pressure on the wire takes place in analogous fashion by loosening the cap 28 with respect to the casing 10. As stated above, the nipple 68 equalizes the pressure applied by wheels 56 to the wire 72.

The invention finds significant utility in wire feeding for welding operations. The invention can be used for feeding MIG or TIG wire in welding. The two-roller assembly drive unit acts as a wire straightener and kink remover in feeding wires and has significantly greater pull than other devices utilizing a single set of rollers. Further, the wedging surfaces of the roller holders function as an automatic tightener in the event that the wire becomes harder to pull. Alternatively, reversal of the roller holder 40 and the tapered stationary members 60 and 62 provides a drive assembly which loosens the grip on the wires to allow slippage as the wire becomes harder to pull. However, in the form shown, some slippage can be achieved depending on the adjusted position of the holders 40.

The invention can be adapted for feeding different sizes of wire and for feeding the wire at different speeds. Changing of the roller holders 40 and/or rollers 56 and wire guides 36 and 20 can adapt the chuck to feed radically different size wire. For more closely sized wires, merely wire guides 36 and 20 need be changed and the roller spacing is achieved by adjusting the cap 28. For still more closely sized diameter wires, only the cap 28 needs to be adjusted.

Further, the rollers can be positioned at different angles in different holders with the result that different feed speeds can be obtained. Thus, although a 45° angle has been found to be suitable for use with the invention, the rollers can be mounted at different angles to achieve different drive speeds.

The invention can thus accommodate a wide variety of wires, including aluminum, stainless steel, solid and hollow core wires, flux core and even non-metallic jacketed wires.

The two sets of feed rollers provide a positive driving pressure for the wire without applying excess pressure to the wire. Excess pressure may deform the wire surface, strip coating from the wires or distort the wire or unravel flux core wires. Further, the use of the multiple sets of drive rollers reduces the likelihood of twisting the wire outside the drive unit.

Although the invention has been described with reference to equal size rollers 56, it is contemplated that the forward drive rollers can be made slightly larger than the rear drive roller. In this manner, the wire fed is put under tension and straightened.

The simplicity of the invention makes it easy to disassemble and to clean without special tools. Reassembly or changing of the roller holders can also be accomplished easily.

The invention is quite versatile. By changing the roller, the speed can be reduced from a maximum of 1200 inches per minute to 5 or 6 inches per minute as, for example, for cold TIG welding. Thus, a 200 to 1 turndown of speed ratio can be achieved with the invention.

Reasonable variation and modification are possible within the scope of the foregoing disclosure, the drawings and appended claims without departing from the spirit of the invention.

The embodiments of the invention in which an exclusive property or privilege is claimed are defined as follows:

1. In a planetary actuator for feeding a wire workpiece wherein two sets of rollers are mounted in a housing with each roller at an acute angle to an axis and the rollers are rotatable about an axis to drive the wire workpiece along the axis, the improvement which comprises:
   a plurality of holders, each of which mounts two rollers, one from each set of said rollers, said holders being axially movable within said housing;
   means biasing said holders to one end of said housing;
   means for selectively moving said holders toward another end of said housing; and
   means for varying the spacing between the holders and between opposing rollers in each set of said rollers at different axial positions of said holders in said housing.

2. A planetary actuator according to claim 1 and further comprising means to equalize the pressure of each set of rollers on said wire workpiece.

3. A planetary actuator according to claim 1 wherein the varying means comprises an axially tapering surface of said holders and a stationary member having a complementary tapering surface in contact with said axially tapering surface of said holder.

4. A planetary actuator according to claim 1 wherein said housing comprises a hollow casing having an open end and a cap covering said open end and forming said one end of said housing, said cap being threaded onto said casing whereby threaded adjustment of the cap with respect to the casing results in axial adjustment of the holders.

5. A planetary actuator according to claim 4 and further comprising means to equalize the pressure on each set of rollers on said wire workpiece.

6. A planetary actuator according to claim 5 wherein there are only two rollers in each set of said rollers.

7. A planetary actuator according to claim 5 wherein said pressure equalizing means comprises a nipple in a central axial portion on one of said holders.

8. A planetary actuator according to claim 5 and further comprising means for biasing said roller holders away from each other.

9. A planetary actuator according to claim 1 wherein said housing comprises a hollow casing having an open end and a cap covering said open end and forming said one end of said housing, said cap being threaded onto said cap, whereby threaded adjustment of said cap with respect to said casing results in axial adjustment of said holders.

* * * * *